(12) United States Patent
Schwartz

(10) Patent No.: US 6,725,810 B2
(45) Date of Patent: Apr. 27, 2004

(54) APPARATUS AND METHOD FOR CONTROLLING AN ANIMAL

(76) Inventor: Wayne D. Schwartz, 8311 SW. Ave., Spivey, KS (US) 67142

( * ) Notice: Subject to any disclaimer, the term of this patent is extended or adjusted under 35 U.S.C. 154(b) by 0 days.

(21) Appl. No.: 10/366,840

(22) Filed: Feb. 14, 2003

(65) Prior Publication Data

US 2003/0116102 A1 Jun. 26, 2003

Related U.S. Application Data

(63) Continuation-in-part of application No. 09/824,450, filed on Apr. 2, 2001.

(51) Int. Cl.⁷ .......................... A01K 15/02; A01K 15/04
(52) U.S. Cl. ..................... 119/720; 119/712; 119/839; 54/71; 54/36
(58) Field of Search ................. 119/712, 905, 119/29, 720, 719, 814, 822, 859, 908, 839; 54/71, 36; 340/573.3; A01K 15/02, 15/04

(56) References Cited

U.S. PATENT DOCUMENTS

| | | | | |
|---|---|---|---|---|
| 470,155 A | * | 3/1892 | Holson | 54/1 |
| 710,267 A | * | 9/1902 | Graf | 54/71 |
| 3,733,350 A | * | 5/1973 | Labart et al. | 428/391 |
| 4,199,921 A | | 4/1980 | Watkins | 54/71 |
| 4,261,293 A | * | 4/1981 | Djernes | 119/422 |
| 4,304,193 A | | 12/1981 | Madden | 119/29 |
| 4,765,276 A | * | 8/1988 | Kime | 54/71 |
| 5,566,645 A | | 10/1996 | Cole | 119/712 |
| 5,809,939 A | * | 9/1998 | Robart et al. | 119/712 |

FOREIGN PATENT DOCUMENTS

DE 03802861 * 2/1988 ........... A01K/11/00

* cited by examiner

Primary Examiner—Peter M. Poon
Assistant Examiner—Andrea M. Valenti
(74) Attorney, Agent, or Firm—Madan, Mossman & Sriram, P.C.

(57) ABSTRACT

An apparatus and method for controlling an animal includes a motorized and programmable actuator unit that is coupled to a bridle on the horse. The actuator unit includes a motor and a pulley to control tension on lines leading to the horse, the tension providing a control stimulus to the animal. A clutch coupling the motor and pulley provides a release function to automatically release tension on the lines once the motor is deactivated. A remote signal unit sends control signals to a controller in the actuator unit for controlling the animal remotely from the horse.

19 Claims, 8 Drawing Sheets

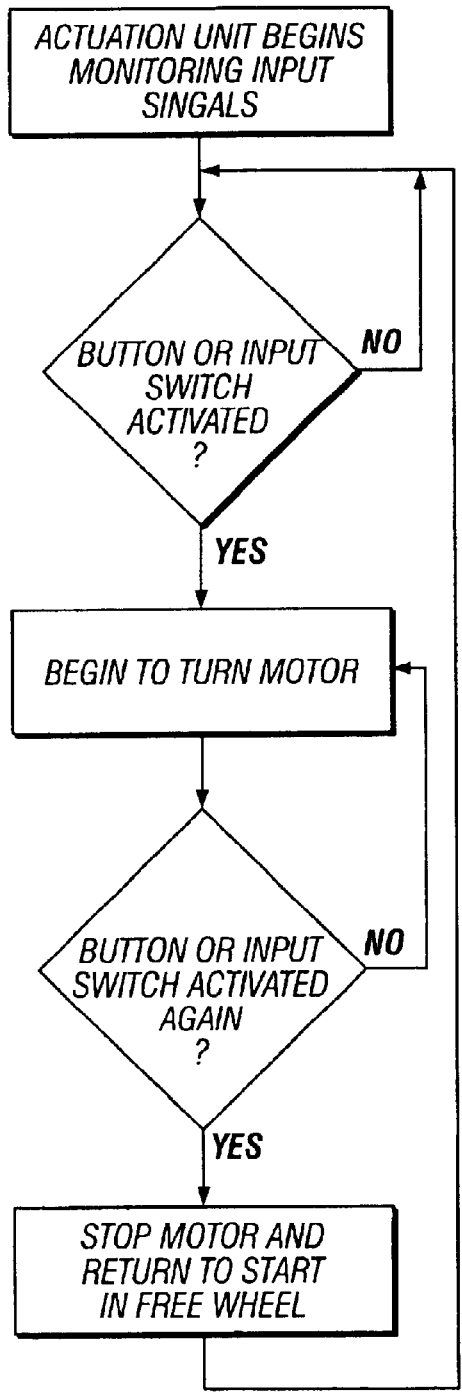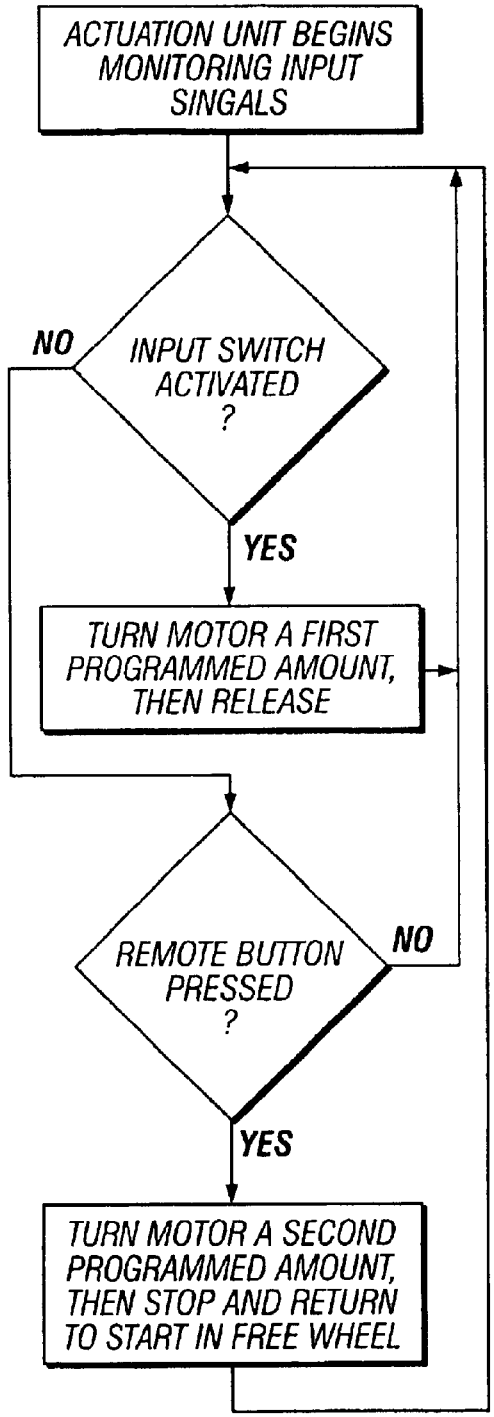
*FIG. 4C*  *FIG. 4D*

APPARATUS AND METHOD FOR CONTROLLING AN ANIMAL

REFERENCE TO RELATED APPLICATIONS

This application is a continuation in part of U.S. patent application Ser. No. 09/824,450 filed on Apr. 2, 2001, the entire specification of which is hereby incorporated herein by reference.

BACKGROUND OF THE INVENTION

1. Field of the Invention

This invention is directed toward an apparatus and method for controlling an animal. More particularly, the invention is directed toward controlling an animal by a remotely controlled system. The remotely controlled system comprises a remote control unit, which provides an input signal to an actuator. The actuator then provides a physical stimulus to the animal.

2. Description of the Related Art

In the equestrian world, a bridle is standard rigging for controlling a horse during various activities. The bridle normally attaches to a set of reins, a lead rope, or a jerk-line for applying a controlling force. For use with horses, such rigging can be used with a rider in a mounted or dismounted state. When mounted, the rider may command the horse to stop or back up by pulling the reins toward the rider. The amplitude and duration of pull force also depend on the rider's desired maneuver as well as the horse's level of training and the horse's sensitivity to commands. Likewise, force applied on one rein represents a command to the horse to turn in a particular direction. The mounted rider typically sits on a saddle. The saddle normally includes a saddle horn for tying the reins or other ropes to the saddle.

The type of rider activity determines how to use such rigging. Typical activities may include training, pleasure riding, cattle ranching, and professional competitions like racing or rodeos. For instance, cattle ranching activities often require the rider to dismount the animal and do work while leaving the animal in a stationary position. Depending on the level of training, the horse may have to be secured to a rigid fence or post to keep the animal from walking away from the rider. Also in pleasure riding, an inexperienced rider may leave an animal unattended and allow the animal to walk away. Again the reins are often tied to a post or held by the rider to secure the animal. For a trained horse, the rider may keep the horse steady by dropping the reins to the ground, a method referred to as "ground-tie". For professional rodeo competitions like calf roping, the rider uses more sophisticated rigging such as a "jerk-line". In competition, the rider must be able to rope a calf, then quickly dismount the horse, proceed to a calf that may be as much as 20–30 feet in front of the horse, and tie the calf's legs while the horse maintains its position. In competition and training, the rider uses the jerk-line to pull the bridle after the rider dismounts the horse encouraging the horse to remain stationary or back up slightly. In competition, the pull is accomplished by tying an end of the line to the bit, feeding it through a pulley connected to the saddle horn and feeding the other end in a weave pattern between the rider's waist and belt. As the rider dismounts and runs forward to the calf, the jerk-line feeds out from the rider's waist and the friction involved causes a pull at the bit. The line is designed to feed completely out of the rider's waist and fall to the ground, thus the rider will lose control of the horse after that time. In training, the rider may simply stand to the side or in front of the horse and pull the jerk-line by hand causing the horse to stop or back up. Another type of rigging used for training purposes is referred to as a tether line. A tether line may be a lead rope from 20–50 feet long with one end tied to the bit and the other end held by a trainer, thus allowing the animal to move in an area without running away.

The use of such rigging has created several needs for an improved control device. Tying a horse with reins to a stationary structure may be inconvenient or impossible thus suggesting the need for another means for holding the horse steady. Also, for the rancher or pleasure rider, the reins or rope are of no use for stopping a horse that is wandering off and is out of the rider's reach; a device to help the rider stop and retrieve such a horse is desirable. The ground-tie method may result in the same situation if the horse is not properly trained or the ground-tie method also may cause the horse to panic if the horse steps on the reins, thus creating the need for a more reliable device. For competition use, the jerk-line is limited to a certain length of about 17 feet, and continued control of the horse is often not possible unless the rider retrieves a line out of his reach. Also, the jerk-line may develop an inconsistent pull on the bridle due to the nature of its use. Information relevant to attempts to address these problems can be found in U.S. Pat. No. 4,304,193 to Madden; U.S. Pat. No. 4,765,276 to Kime; and U.S. Pat. No. 5,566,645 to Cole. However, each of these suffers from one or more of the following technical and commercial disadvantages relative to the present invention: (a) the design does not solely address the foregoing needs; (b) the complexity does not allow for economical manufacture of a device that addresses the foregoing needs; (c) the complexity does not provide the user with an efficient interface; and (d) the device as illustrated is too large and cumbersome to be used with a saddle for the activities described above. Moreover, typical proposed solutions such as the above do not address issues related to controlled force applied to the animal, nor do they adequately address the need to free-rein the animal in an autonomous fashion.

For the foregoing reasons, there has been a long-felt need for a horse controlling device that can be used with a typical saddle and can allow a rider to use the device while mounted or dismounted from the saddle. Another long-felt need has been for a device that is built solely for the purpose of stopping or backing up a horse. Another long-felt need has been for a device of this nature that is inexpensive to manufacture and therefore is a reasonable cost to the consumer. Yet another need for the device is that it be a rugged and robust design. These needs require the device to be lightweight, have a small form factor, and be weather resistant.

It is therefore an object of the present invention to provide an economical apparatus for electronically controlling an animal using controlled torque and autonomous free-rein when a control stimulus is not applied.

SUMMARY OF THE INVENTION

The present invention is directed to an apparatus and method that satisfy the needs for controlling a horse. The horse controlling apparatus adapted to act upon a bridle having features of the present invention includes a remote signal unit. The apparatus further includes an actuation unit that is mechanically coupled to a horse and electronically coupled to the remote signal unit. The actuation unit further includes a control unit, an actuator that is electrically coupled to the control unit, and a battery that is electrically coupled to the control unit and the actuator so that the horse can simultaneously carry the actuation unit, a saddle, and a rider sitting on the saddle.

The actuator includes a motor and a reel coupled to a shaft, the motor applying a force to a line wound about the reel by turning a shaft. A clutch assembly in the actuator releases the force autonomously when power is removed from the motor.

In another embodiment, the control unit includes a torque control device to vary the torque applied by the motor from 0 ft-lbs to about 40 ft-lbs or more. The torque might be varied by varying voltage applied to the motor.

In a preferred embodiment, the actuator may be mechanically coupled to the bridle. In another preferred embodiment, the actuator may be located forward of a saddle, the saddle being attached to the horse. In another preferred embodiment, the control unit and battery may be located behind a saddle, the saddle being attached to the horse. In another preferred embodiment, the actuator may be attached to the saddle. In another preferred embodiment, the control unit may include a programmable controller. In another preferred embodiment, the actuator may include a gear train coupled to the electric motor and bridle. In another preferred embodiment, the apparatus further includes a saddle. In another preferred embodiment, the actuation unit is secured inside the saddle.

An apparatus adapted to act upon a bridle having features of the present invention includes a remote signal unit. The apparatus further includes an actuation unit that is mechanically coupled to a horse and electronically coupled to the remote signal unit. The actuation unit further includes a control unit, an actuator electrically coupled to the control unit, and a battery electrically coupled to the control unit and the actuator so that the actuator applies a control stimulus only to the bridle. In a preferred embodiment, the horse can simultaneously carry the actuation unit, a saddle, and a rider sitting on the saddle.

An apparatus having features of the present invention includes a remote signal unit. The apparatus further includes an actuation unit adjacent to the saddle and electronically coupled to the remote signal unit. The actuation unit further includes a control unit, an actuator electrically coupled to the control unit, and a battery electrically coupled to the control unit and the actuator so that the actuator is housed in a first housing and the control unit and the battery are housed in a second housing.

A method having features of the present invention includes the step of electronically sending a signal from a remote signal unit to an actuation unit. The method further includes receiving the signal at the actuation unit, actuating the bridle with the actuation unit based on the signal and other inputs to the actuation unit. In a preferred embodiment, the step of actuating the bridle includes successive pulling and releasing motions applied to the bridle. The bridle is actuated by applying a force to a line coupled to the bridle, and the force is autonomously removed when the actuating command is removed. In a preferred embodiment actuating force is varied using a torque control device coupled to a motor, where the motor drives a shaft to apply the actuating force.

The present invention has a number of advantages. One advantage is that the horse may be controlled from a remote location without a line connected to the horse. Another advantage is that the apparatus is simple and has only the required functionality thereby making the apparatus inexpensive and practical to the consumer. Another advantage is that the apparatus may include an actuator that is programmable and therefore repeatable. Another advantage is that the apparatus may be detachable from the saddle. Another advantage is that the apparatus may be secured in part or entirely internal to the saddle so that the saddle form factor is substantially unchanged.

BRIEF DESCRIPTION OF THE DRAWINGS

These and other features, aspects, and advantages of the present invention will become better understood with reference to the following description and appended claims and accompanying drawings in which:

FIG. 4C is a flow chart of a third operating mode according to the invention; and FIG. 4D is a flow chart of a fourth operating mode according to the invention.

DESCRIPTION OF THE EMBODIMENTS

Figure 1:
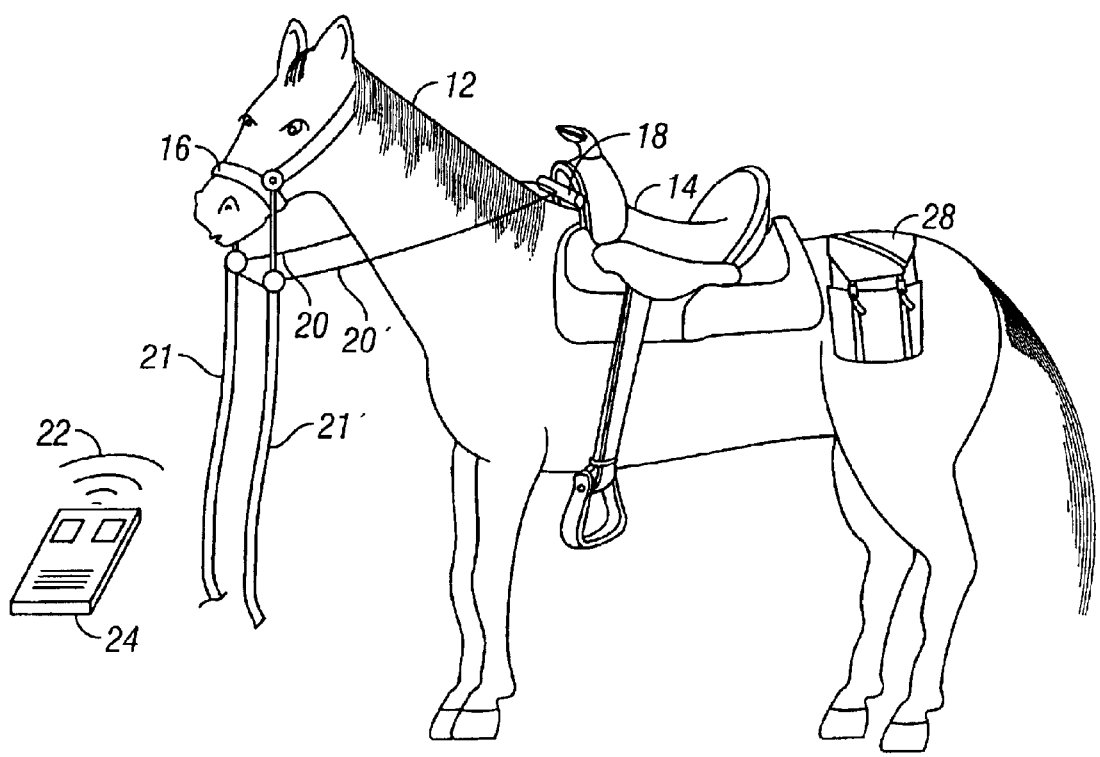
FIG. 1 is a pictorial view of a horse outfitted with a control apparatus embodying features of the present invention.

An embodiment of the present invention is illustrated in FIG. 1. In the example of FIG. 1, a horse 12 is fitted with a saddle 14 and a bridle 16. The bridle 16 is connected to an actuation unit 18 with a first line 20 and a second line 20' so that the actuation unit 18 may apply a control stimulus to the bridle. A first rein 21 and a second rein 21' may be coupled to the bridle 16. The horse 12 may also be fitted with a saddlebag 28. The actuation unit 18 is electrically coupled to a remote signal unit 24 by a remote signal 22. The actuation unit 18 is mechanically coupled to the first line 20 and the second line 20'.

Figure 2A:
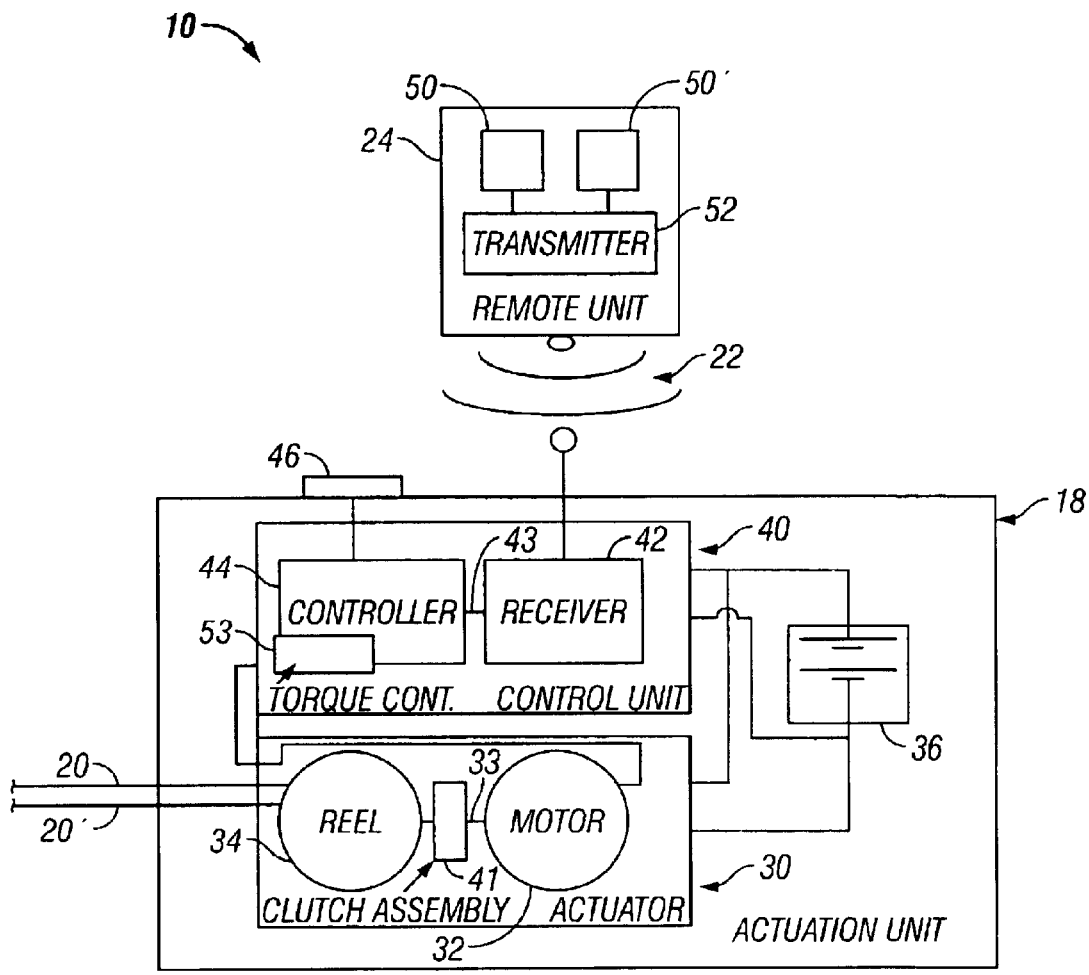
FIG. 2A is a schematic diagram of a second version of an actuation unit usable in the control apparatus of FIG. 1.

Referring to FIG. 2A, a horse controlling apparatus 10 includes the remote signal unit 24 and the actuation unit 18 coupled by the remote signal 22. The actuation unit 18 includes a control unit 40 for receiving the remote signal 22, and an actuator 30. The control unit 40 and the actuator 30 are powered by a battery 36. The control unit 40 further includes a receiver 42 which receives the remote signal 22. The controller 44 is coupled to the receiver 42 by an input data link 43 and optionally to at least one input switch 46 mounted external to the control unit. The controller 44 is further coupled to the actuator 30 by a motor control link 35. The actuator 30 includes an electric motor 32, connected to a reel 34 by a shaft 33. The lines 20 and 20' are coupled to the reel 34.

In a preferred embodiment, a clutch assembly is coupled to the shaft 33. The clutch assembly provides a release function to free wheel the reel 34 to allow the animal to free-rein once the motor is deactivated. Free-reining the control lines 20 and 20' allows the animal to move its head as necessary for comfort and removes the control stimulus immediately upon motor deactivation without having to reverse the motor to loosen the lines 20 and 20'.

The controller 44 further includes a torque control 53. The torque control 53 is preferably adjustable by a user such as a rider or trainer. In one embodiment, the torque control is adjustable using a signal transmitted from the transmitter 24. The signal is received by the actuation unit at the receiver 42 and subsequently processed in the controller to adjust the torque control. The adjustment is preferably made to input voltage to the motor 32 to control motor output torque. In a preferred embodiment, the motor output torque is adjustable between the values of 0 to 40 ft-lbs of torque applied to the shaft 33. Additional force can be obtained by motor and/or voltage selection, so the present invention is not necessarily limited to the above adjustment value.

Figure 2B:
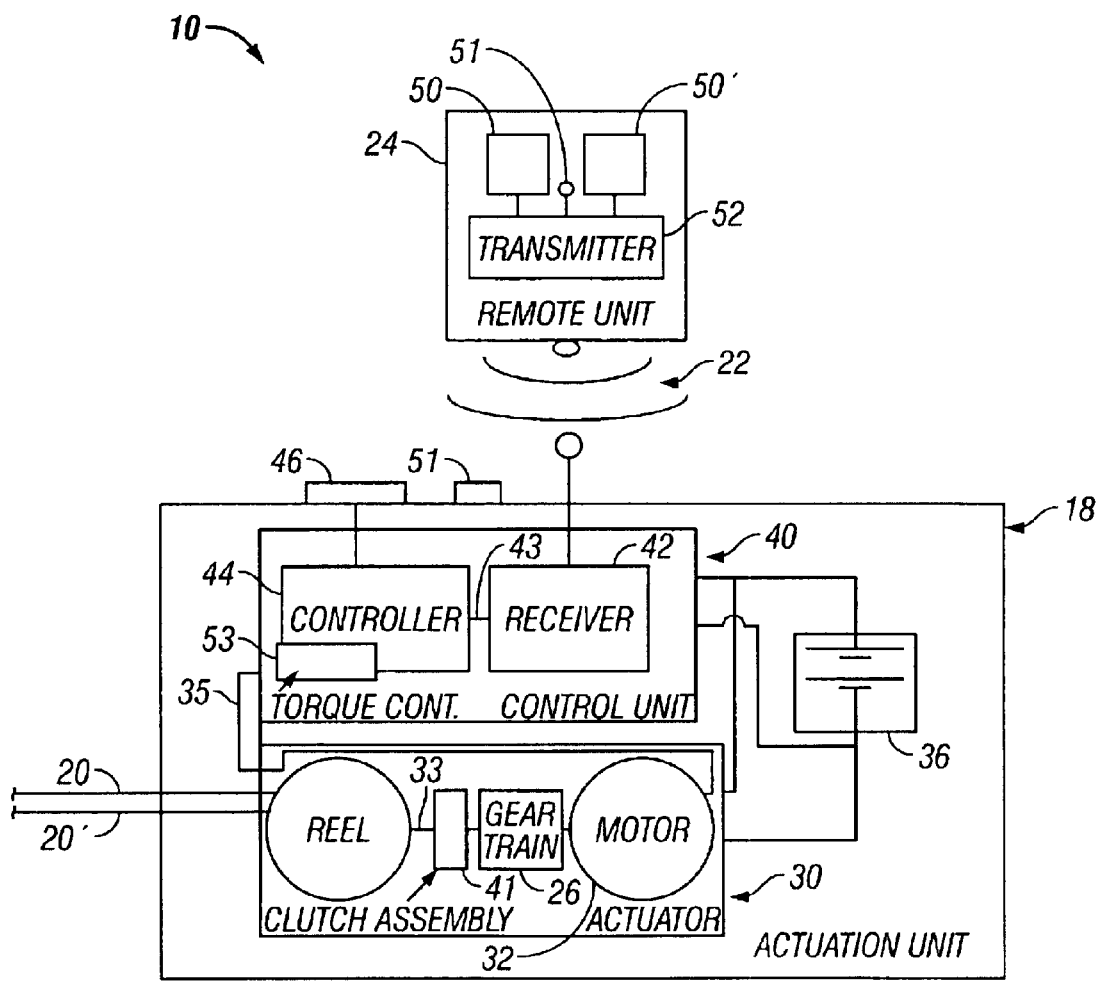
FIG. 2B is a schematic diagram of a third version of an actuation unit usable in the control apparatus of FIG. 1.

Referring to another version of the invention in FIG. 2B, the actuator 30 includes an electric motor 32, coupled to a reel 34 by a shaft 33 and a gear train 26. The gear train provides a reduction in shaft speed going from the motor 32 to the reel 34 thereby providing increased torque to the reel 34. FIG. 2B also shows the torque control 53 and clutch assembly 41 as described above and shown in FIG. 2A. A potentiometer 51 can be mounted on the actuation unit housing for direct control of the torque control 53.

Figure 2C:
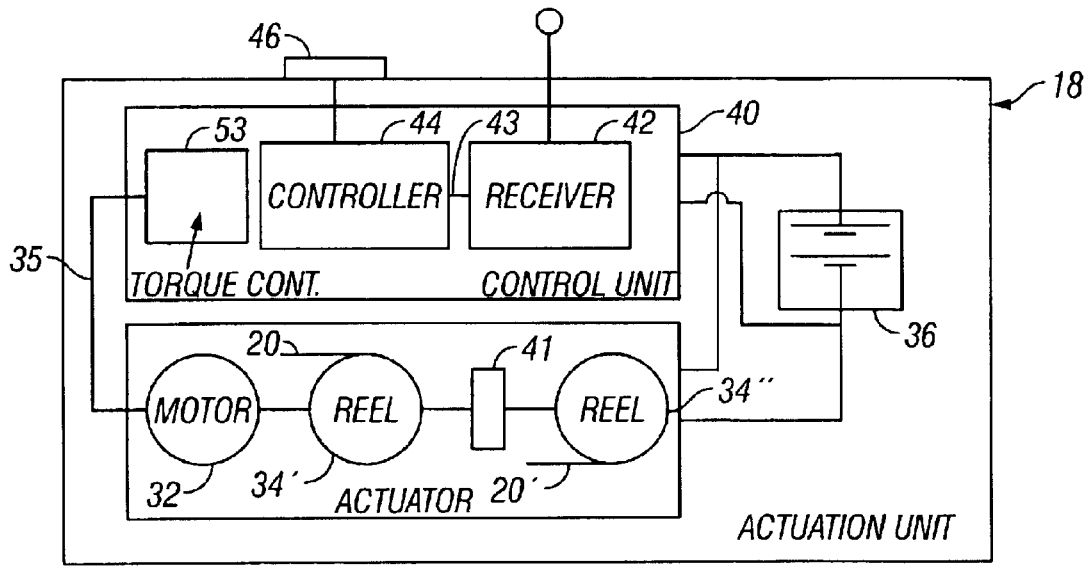
FIG. 2C is a schematic diagram of a fourth version of an actuation unit usable in the control apparatus of FIG. 1.

Referring to FIG. 2C, the actuator 30 may optionally include an electric motor 32 coupled to a first reel 34' and a second reel 34" with a clutch assembly 41 disposed on a shaft 33. The first reel 34' is coupled to the first line 20 and the second reel 34" is coupled to the second line 20'. As described above, the clutch assembly operates to release the tension on the lines 20 and 20' as soon as the control signal disengages the motor 32.

Figure 2D:
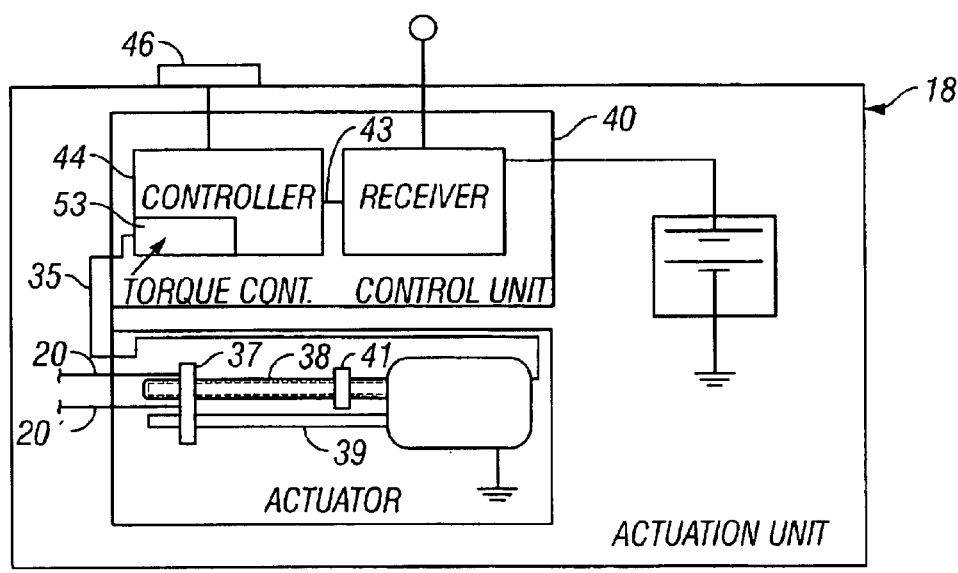
FIG. 2D is a schematic diagram of a fifth version of an actuation unit usable in the control apparatus of FIG. 1.

In an alternative embodiment, illustrated in FIG. 2D, the actuator 30 includes an electric motor 32 coupled to a threaded shaft 38. A slide 37 is coupled to a rod 39 and to the threaded shaft 38 so that turning the electric motor 32 advances the slide 37 along the threaded shaft 38. The lines 20 and 20' are coupled to the slide 37.

Figure 2E:
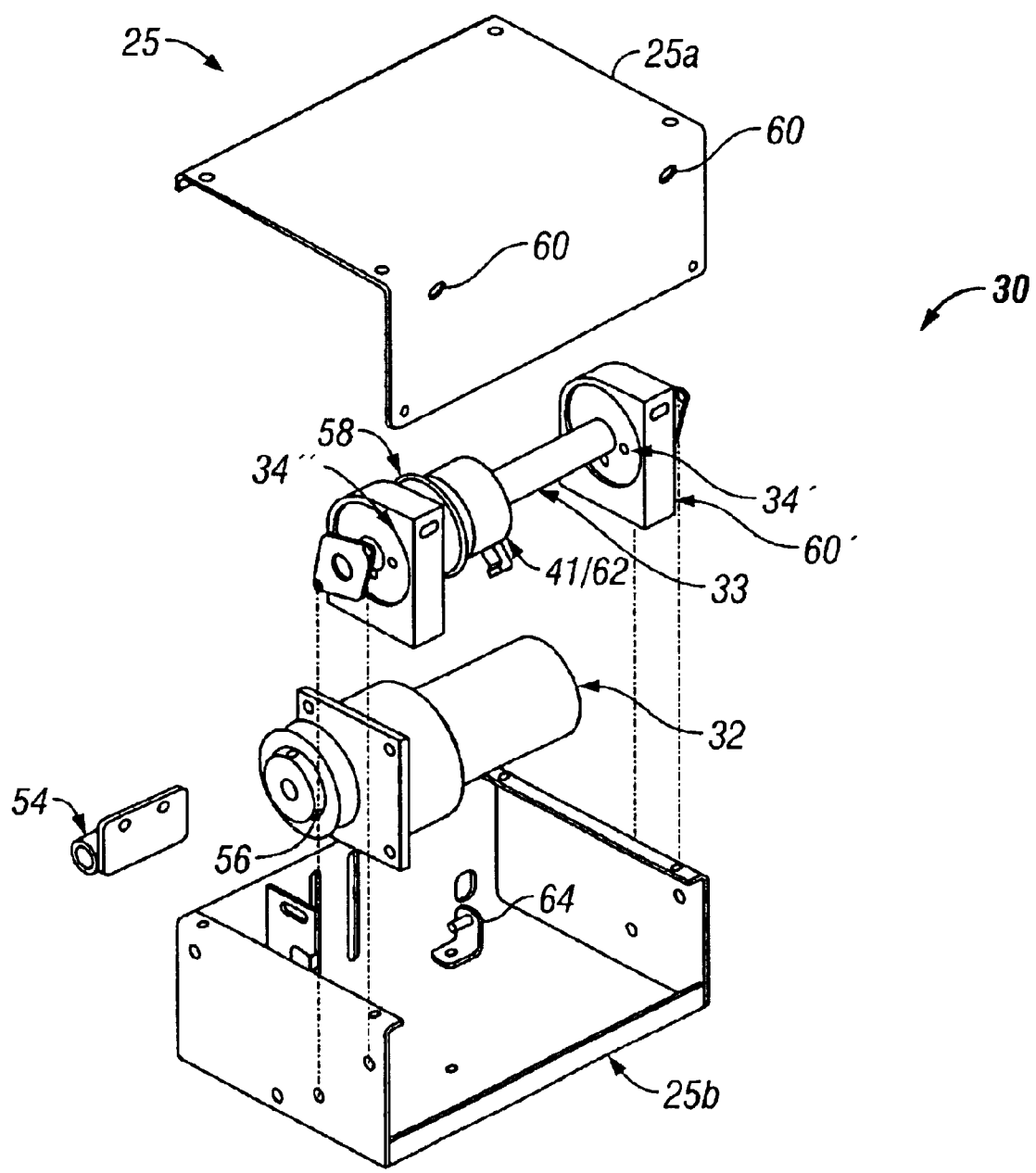
FIG. 2E is an exploded view of an actuator according to the present invention having a clutch device.

FIG. 2E is an exploded view of an actuator according to the present invention having a clutch assembly 41. Shown is an actuator 30 disposed in a housing 25. The housing includes a lid portion 25a and a body portion 25b. An adjustable coupling 54 is fixed to the housing 25 for adjustably mounting the housing on a saddle. A motor 32 is mounted in the housing 25 using any suitable mounting device. The motor 32 preferably includes a motor pulley 56 for engaging a shaft pulley 58 mounted on a shaft 33. The embodiment shown is a two-reel configuration such as described above and schematically shown in FIG. 2C. This embodiment includes a first reel 34' and a second reel 34". Not-shown lines 20 and 20' wound about the reels 34' and 34" exit the housing via corresponding guide apertures 60, and the lines lead to the animal as described above.

The clutch assembly 41 is coupled to the shaft 33 to provide a release function when the motor 32 is not engaged. The clutch assembly 41 includes a clutch 62 and a clutch dog 64. The clutch dog engages and disengaged the clutch when the motor is activated and deactivated. When the motor is activated, the clutch is locked to provide tension on the lines 20 and 20', the tension being translated to a control stimulus to cue the animal. When power is removed from the motor, then the clutch is unlocked and the lines 20 and 20' are released from tension by free wheeling the reels 34' and 34". Those skilled horsemen understand that constant tension on the animal after the animal has responded to a command stimulus, likely results in the animal continuing to respond in an undesirable manner.

The clutch assembly is preferably an electromechanical spring-wrap clutch assembly. The electromechanical clutch assembly receives an electrical power signal when the motor is energized. When the motor is not energized the clutch assembly power signal is removed and the clutch automatically unlocks and enters a "free-wheel" mode to allow the control lines to loosen. One clutch assembly useful in the present invention is the EC75 Clutch assembly available from REELL Precision Manufacturing Corporation, 1259 Willow Lake Boulevard, Saint Paul, Minn. 55110.

Figure 3:
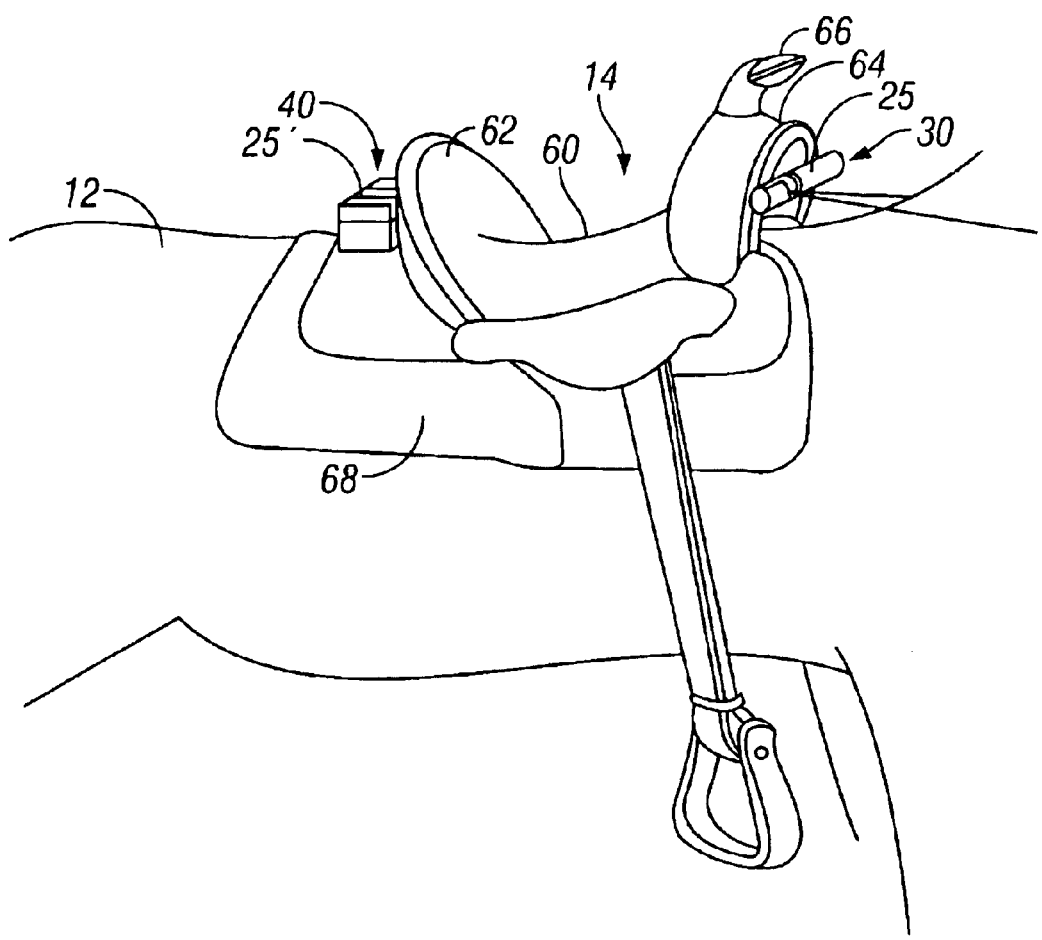
FIG. 3 is a partial pictorial view of a horse outfitted with another version of a control apparatus having features of the invention.

Referring to FIG. 3, the horse controlling apparatus 10 may be contained in one or more housings attached to the horse 12, or the saddle 14 or both. For instance, FIG. 3 shows how the actuator 30 is attached in front of the saddle 14 in a first housing 25 and the control unit 40 is attached behind the saddle 14 in a second housing 25'. Referring back to FIG. 1, the control unit 40 and battery 36 may alternatively be contained in a saddlebag 28. In either of these configurations, the control unit 40, actuator 30, and battery 36 are readily detachable.

In the embodiment of FIG. 2A, the remote signal unit 24 includes a first button 50, a second button 50', and a transmitter 52. The first button 50 and second button 50' may be push type switches. In an alternative embodiment, the transmitter 52 may be a radio frequency (RF) transmitter or an infrared (IR) transmitter. Optionally, the transmitter 52 may be omitted so that the first button 50 and the second button 50' may be connected by wire to the control unit 40. The remote signal unit 24 may preferably be a small keychain-sized device such as the TX-99K-2 manufactured by Ming Microsystems Inc. In an alternative embodiment illustrated in FIG. 2B, the remote signal unit 24 may include a potentiometer 51 and the actuation unit 18 may include a potentiometer 51 mounted external to a housing.

The potentiometers can be configured easily to provide either a transmitted signal or a direct signal to adjust the torque control 53. The potentiometer 51 can also be configured to send the signal for the animal control stimulus.

The receiver 42 may include a radio frequency (RF) receiver or an infrared (IR) receiver. In a preferred embodiment, the RF receiver may be the RE-99 manufactured by Ming Microsystems. The controller 44 may include a programmable microcontroller such as the BASIC Stamp BS2 manufactured by Parallax, Inc.

The entire actuation unit 18 may be contained in one or more housings. The one or more housings may be constructed of a material such as plastic, steel, or aluminum. Impact-resistant, injection-molded plastics such as polycarbonate, ABS, and polysulfone are well suited for this sort of enclosure. The one or more housings may also be constructed to furnish a water-tight seal about the internal components. The one or more housings may be rectangular or cylindrical in shape to enhance manufacturability or to allow easy attachment to the saddle or horse. The housing may also include one or more mounted switches, buttons, or potentiometers. Such devices are useful for selecting a particular operating mode or fine tuning a particular operating mode.

The battery 36 may be a rechargeable battery such as a NiCad or Lithium Ion battery. The lines 20 and 20' may be made of wire rope, nylon braided rope, or a composite braided rope such as Kevlar$^\cong$. The bridle 16 normally includes a head stall, a chin strap, and a bit.

Referring to FIG. 3, the saddle 14 typically includes a seat 60, a cantle 62, a tree 64, a horn 66, and a skirt 68. An example of such a saddle is Model #3767-1554 manufactured by Circle Y of Yoakum, Inc. In another embodiment, the control unit 40 or the actuator 30 may be secured inside the saddle 14 so that its external form factor is substantially unchanged from its original shape. This may be accomplished by building the actuator 30, or the control unit 40 into the structure of the seat 60, cantle 62, or tree 64.

Figure 4A:
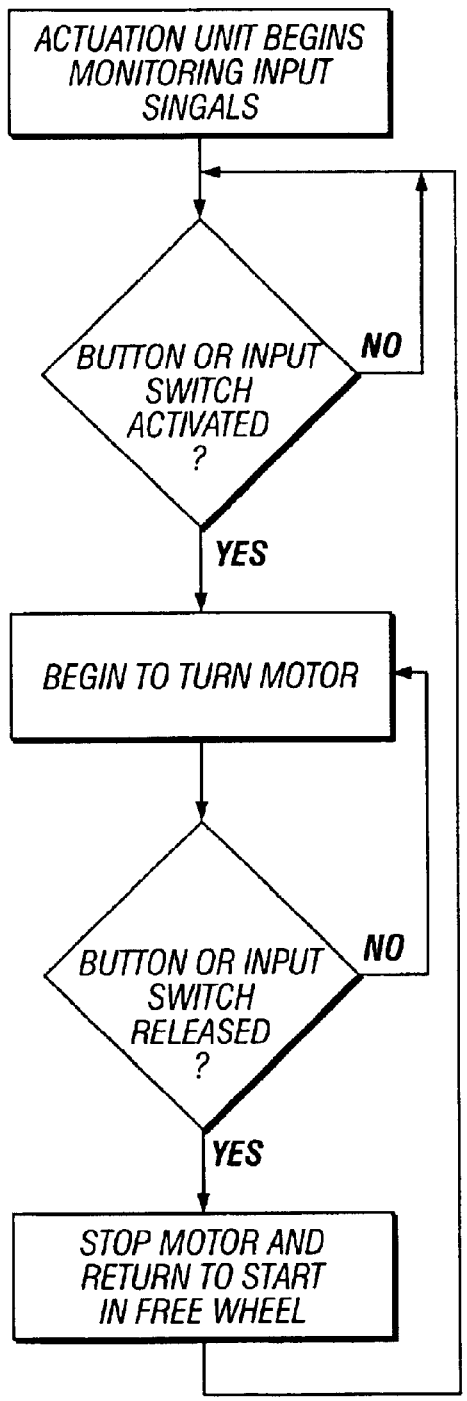
FIG. 4A is a flow chart of a first operating mode according to the invention.
Figure 4B:
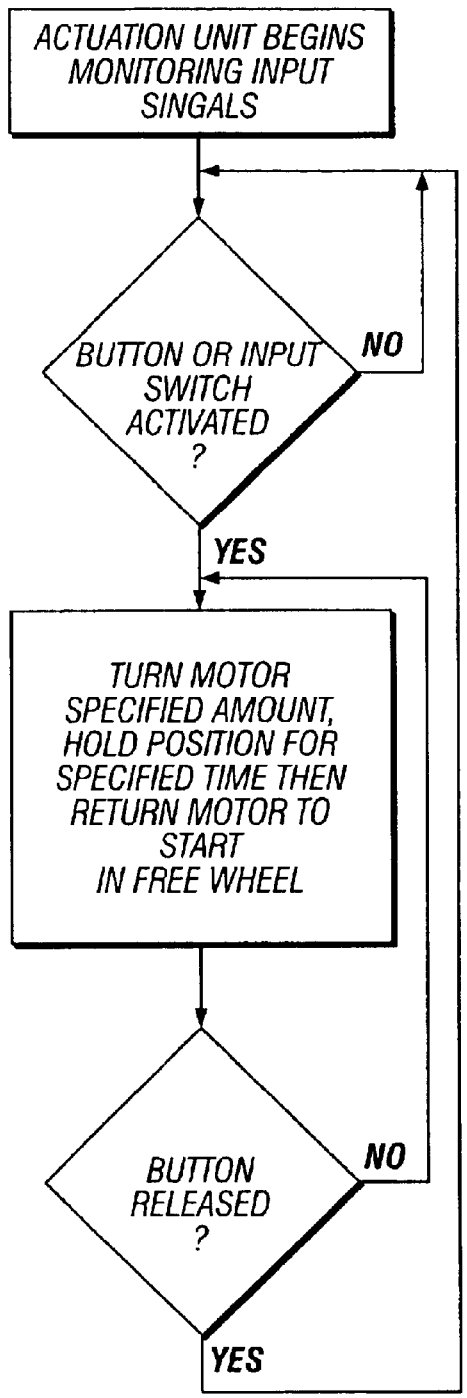
FIG. 4B is a flow chart of a second operating mode according to the invention.

The control apparatus of the present invention may be operated in several modes. For instance, the horse 12 may be stopped or held in a stopped position according to the method illustrated in FIG. 4A. The actuation unit 18 begins monitoring for input signals; specifically for the user to press the button 50, the button 50', or the input switch 46. The electric motor 32 is provided with power and the actuation unit 18 monitors when the activated button or switch is released at which point the electric motor 32 is stopped and returned to the start position in free wheel by use of the clutch assembly 41. FIG. 4B illustrates another mode where the system responds to the activated button or switch by turning the electric motor 32 some programmed amount, then holding the position and finally returning the electric motor 32 to its original position and free wheeling the pulleys using the clutch assembly 41. Again, the actuation unit 18 begins monitoring for input signals. When a signal is received, the electric motor 32 turns a programmed amount, holds its position for a programmed time, then returns to the start position. If the button or switch is deactivated at this point, the actuation unit 18 begins monitoring again. Note that the electric motor 32 starts again if the button or switch is activated. FIG. 4C illustrates a third mode where a button or switch activation starts the electric motor 32 and a second button or switch activation stops and reverses the electric motor 32 to its original position while the clutch releases tension on lines 20 and 20'. The mode of FIG. 4C may be implemented with two buttons or switches so that one specifically turns the electric motor 32 in one direction and another button or switch turns the electric motor 32 in another direction. Other variations are possible and may be more suitable in certain circumstances. The foregoing may be useful for pleasure riding, ranching, competition, or training operations.

In competition, the actuation unit may be preprogrammed to engage and release the lines automatically followed by a state where the actuation unit waits for further commands from the user as illustrated in FIG. 4D. For instance, in calf roping, the rider may press a button on the actuation unit during a dismount. Doing so may activate a programmed sequence of movements to engage and release the reins in a manner similar to how a jerk-line is used. Unlike the typical jerk-line method, the user may have continued manual control over the horse after dismount through use of the remote signal unit 24. In addition, the programmed control provides a consistent input to the horse.

The previously described versions of the present invention have many advantages. By having an apparatus that works with a typical saddle, the user may more easily use the apparatus with saddles from different manufacturers. Also, by having an apparatus that only acts on or provides a control stimulus to the bridle, the apparatus is simple, small, and inexpensive.

While there has been described what are believed to be the preferred embodiments of the present invention, those skilled in the art will recognize that other and further changes and modifications may be made thereto without departing from the scope of the invention, and it is intended to claim all such changes and modifications as fall within the true scope of the invention.

What is claimed is:

1. An apparatus for controlling a horse comprising:
   a) a housing disposed on the horse in a non-interfering relationship with a seating position of a human rider on a saddle on the horse's back;
   b) an actuator disposed in the housing, the actuator being mechanically coupled to the horse by a line, the actuator being adapted to exert a force on the line as a control stimulus for controlling the horse; the actuator including a motor;
   c) a release device coupled to the actuator for autonomously removing the force applied to the line;
   d) a control unit coupled to the actuator for converting a signal representing a desired command to an actuator command used by the actuator for controlling the force applied to the line; and
   e) a remote signal unit for transmitting the signal to the control unit.

2. The apparatus of claim 1, wherein the housing includes a coupling for mounting the housing on a saddle portion.

3. The apparatus of claim 1 further comprising a torque control device operatively coupled to the actuator and control unit for controlling a level of torque applied by the actuator.

4. The apparatus of claim 1, wherein the actuator includes an electric motor coupled to a shaft and a reel coupled to the shaft and a line wound on the reel and coupled to the animal.

5. The apparatus of claim 4, wherein the release device is a clutch assembly coupled to the shaft.

6. The apparatus of claim 1, wherein the control unit comprises a receiver for receiving the signal.

7. The apparatus of claim 1 wherein the actuator is located forward of the saddle.

8. The apparatus of claim 1 wherein the control unit is located behind the saddle.

9. The apparatus of claim 1 wherein the actuator is attached to the saddle.

10. The apparatus of claim 1 wherein the control unit includes a programmable controller.

11. The apparatus of claim 1 wherein the actuator includes a gear train coupled to a shaft and an electric motor for rotating the shaft in response to the transmitted signal, the gear train being adapted to control shaft speed.

12. The apparatus of claim 1 wherein the actuation unit is secured inside the saddle.

13. A method of controlling an animal comprising:
   a) providing a set of reins for use by a rider as a first animal control, said reins being coupled to the animal;
   b) providing a control stimulus to the animal by applying force to a line coupled to the animal using an actuation unit in a housing disposed on the animal, the actuation unit including a motor and a reel, wherein the line is wound on the reel, and wherein mounting said actuation unit to said animal while allowing said rider to be positioned simultaneously in a saddle on said animal's back;
   c) operating the actuation unit using a remote signal;
   d) autonomously releasing the control stimulus using a release device to remove the applied force.

14. The method of claim 13 further comprising generating the remote signal with a remote signal unit.

15. The method of claim 13, wherein the remote signal includes one of i) a RF signal and ii) an IR signal.

16. The method of claim 13 further comprising adjusting the actuating force using an adjustable torque control.

17. The method of claim 13, wherein the release device is a clutch assembly disposed between the motor and reel, the clutch assembly releasing the applied force when the motor is deactivated.

18. The method of claim 13 further comprising controlling the horse from a seated position in a saddle on the horse.

19. The method of claim 13, wherein a rider is riding the horse and is controlling the horse using the reins, the method further comprising sending the remote signal from a remote unit located away from the horse and rider.

* * * * *